(12) United States Patent
Jorgensen et al.

(10) Patent No.: US 12,396,400 B2
(45) Date of Patent: Aug. 26, 2025

(54) FEED TRAIN ASSEMBLIES WITH SKEWED FEEDER ROLLER PAIRS FOR A SUGARCANE HARVESTER

(71) Applicant: CNH Industrial America LLC, New Holland, PA (US)

(72) Inventors: Craig Jorgensen, Racine, WI (US); Gilberto Jose Ribeiro Alves, Piracicaba (BR); Daenio Cleodolphi, Piracicaba (BR); João Augusto Marcolin Lucca, São Pedro (BR); Todd Cyrus Gaudet, Saint Martinville, LA (US)

(73) Assignee: CNH Industrial America LLC, New Holland, PA (US)

( * ) Notice: Subject to any disclaimer, the term of this patent is extended or adjusted under 35 U.S.C. 154(b) by 821 days.

(21) Appl. No.: 17/473,288

(22) Filed: Sep. 13, 2021

(65) Prior Publication Data

US 2022/0078973 A1    Mar. 17, 2022

Related U.S. Application Data

(60) Provisional application No. 63/077,103, filed on Sep. 11, 2020.

(51) Int. Cl.
*A01D 61/00*   (2006.01)
*A01D 45/10*   (2006.01)
(52) U.S. Cl.
CPC .......... *A01D 61/008* (2013.01); *A01D 45/10* (2013.01)

(58) Field of Classification Search
CPC .............................. A01D 61/008; A01D 45/10
See application file for complete search history.

(56) References Cited

U.S. PATENT DOCUMENTS

| | | | | |
|---|---|---|---|---|
| 4,386,492 A * | 6/1983 | Tilby | ..................... | A01D 45/10 56/60 |
| 5,157,904 A * | 10/1992 | Otten | ..................... | A01D 45/10 56/60 |
| 8,230,668 B2 * | 7/2012 | Hinds | ..................... | A01D 45/10 56/53 |
| 8,230,669 B2 * | 7/2012 | Hinds | ..................... | A01D 45/10 56/53 |
| 9,857,785 B2 * | 1/2018 | Richard | ................. | A01D 45/10 |
| 10,194,589 B2 * | 2/2019 | Almeida | ................ | A01D 45/10 |
| 2006/0123759 A1 * | 6/2006 | Fox | ........................ | A01D 82/02 56/16.4 C |

(Continued)

*Primary Examiner* — Arpad Fabian-Kovacs
(74) *Attorney, Agent, or Firm* — Dority & Manning, P.A.

(57) ABSTRACT

A feed train assembly for a sugarcane harvester includes a first feed section comprising a plurality of first pairs of upper and lower feed rollers configured to receive a first mat of sugarcane, with such pairs of upper and lower feed rollers comprising a first upstream pair of upper and lower feed rollers. The feed train assembly also includes a second feed section comprising a plurality of second pairs of upper and lower feed rollers configured to receive a second mat of sugarcane, and a combined feed section configured to receive the first and second mats of sugarcane from the first and second feed sections, respectively. A rotational axis of the lower feed roller of the first upstream pair of upper and lower feed rollers is oriented non-parallel relative to a rotational axis of the upper feed roller of the first upstream pair of upper and lower feed rollers.

18 Claims, 4 Drawing Sheets

(56) References Cited

U.S. PATENT DOCUMENTS

| | | | |
|---|---|---|---|
| 2014/0165522 A1* | 6/2014 | Braunbeck | A01D 45/10 56/60 |
| 2015/0359177 A1* | 12/2015 | Richard | A01D 45/10 56/14.7 |
| 2015/0362904 A1* | 12/2015 | Scrivner | A01D 41/127 700/275 |
| 2017/0280626 A1* | 10/2017 | Bertino | A01D 75/28 |
| 2018/0177129 A1* | 6/2018 | Almeida | A01D 45/10 |
| 2018/0177130 A1* | 6/2018 | Almeida | A01D 43/08 |
| 2018/0177132 A1* | 6/2018 | Almeida | A01D 45/10 |

\* cited by examiner

FEED TRAIN ASSEMBLIES WITH SKEWED FEEDER ROLLER PAIRS FOR A SUGARCANE HARVESTER

FIELD OF THE INVENTION

The present subject matter relates generally to agricultural harvesters, such as sugarcane harvesters, and, more particularly, to a feed train assembly for a sugarcane harvester that includes one or more skewed or offset feeder roller pairs.

BACKGROUND OF THE INVENTION

In an ever-changing agricultural landscape, adaptability is important to allow both manufacturers of agricultural harvesters and the end-users of such harvesters to be able to accommodate varying market demands, as well as varying trends in planting arrangements and/or the like. The need for such adaptability is particularly relevant in the cultivation and harvesting of sugarcane and other tall, stalky patents, where the industry is undergoing a rapid evolution in terms of both the development of new varieties of plants and the use of varying planting configurations, all with an eye towards increased productivity. In this regard, manufacturers of sugarcane harvesters have made substantial efforts to provide machines that accommodate the varying market demands, such as by designing harvesters capable of harvesting two or more crop rows as opposed to a single row (i.e., multi-row harvesting). For example, U.S. Pat. No. 10,194,589, entitled "Multi-Row Sugarcane Harvester Feed Section," discloses a feed section for a sugarcane harvester with first and second feed trains for conveying respective mats of sugarcane deriving from separate rows to a downstream feed train for subsequent delivery to a chopper section of the harvester. Each feed train includes pairs of parallel upper and lower feed rollers, with each upper roller having a rotational axis that is parallel to the rotational axis of the lower roller with which it is paired. Such pairs of parallel upper and lower feed rollers are spaced apart from one another along the length of each feed train.

While the above-described feed section provides an arrangement for harvesting two rows of sugarcane, further refinements and improvements are needed to accommodate the ever-changing market demands. For instance, the matched pairs of parallel upper and lower feed rollers spaced apart along the entire length of each feed train requires a longer overall feed section to convey the mats of sugarcane from the field to the chopper section, thereby resulting in a longer overall machine length.

Accordingly, what is needed in the industry is a new feed train assembly that can be used within a multi-row sugarcane harvester that addresses one or more of the issues of the prior art.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a feed train assembly for a sugarcane harvester configured to simultaneously harvest first and second rows of sugarcane. The feed train assembly includes a first feed section configured to receive a first mat of sugarcane deriving from the first row of sugarcane, the first feed section comprising a plurality of first pairs of upper and lower feed rollers configured to convey the first mat of sugarcane from a first inlet of the first feed section to a first outlet of the first feed section. The plurality of first pairs of upper and lower feed rollers comprises a first upstream pair of upper and lower feed rollers positioned adjacent to the first inlet of the first feed section. The feed train assembly also includes a second feed section configured to receive a second mat of sugarcane deriving from the second row of sugarcane, with the second feed section comprising a plurality of second pairs of upper and lower feed rollers configured to convey the second mat of sugarcane from a second inlet of the second feed section to a second outlet of the second feed section. Additionally, the feed train assembly comprises a combined feed section positioned downstream of the first and second feed sections and configured to receive the first and second mats of sugarcane from the first and second feed sections, respectively. Moreover, a rotational axis of the lower feed roller of the first upstream pair of upper and lower feed rollers is oriented non-parallel relative to a rotational axis of the upper feed roller of the first upstream pair of upper and lower feed rollers.

In another aspect, the present subject matter is directed to a feed train assembly for a sugarcane harvester configured to simultaneously harvest first and second rows of sugarcane. The feed train assembly includes a first feed section configured to receive a first mat of sugarcane deriving from the first row of sugarcane, with the first feed section comprising a plurality of first pairs of upper and lower feed rollers configured to convey the first mat of sugarcane from a first inlet of the first feed section to a first outlet of the first feed section. The plurality of first pairs of upper and lower feed rollers comprises a first upstream pair of upper and lower feed rollers positioned adjacent to the first inlet of the first feed section. The feed train assembly also incudes a second feed section configured to receive a second mat of sugarcane deriving from the second row of sugarcane, with the second feed section comprising a plurality of second pairs of upper and lower feed rollers configured to convey the second mat of sugarcane from a second inlet of the second feed section to a second outlet of the second feed section. The plurality of second pairs of upper and lower feed rollers comprises a second upstream pair of upper and lower feed rollers positioned adjacent to the second inlet of the first feed section. In addition, the feed train assembly includes a combined feed section positioned downstream of the first and second feed sections and configured to receive the first and second mats of sugarcane from the first and second feed sections, respectively, Moreover, a rotational axis of the lower feed roller of the first upstream pair of upper and lower feed rollers is oriented non-parallel relative to a rotational axis of the upper feed roller of the first upstream pair of upper and lower feed rollers, and a rotational axis of the lower feed roller of the second upstream pair of upper and lower feed rollers is oriented non-parallel relative to a rotational axis of the upper feed roller of the second upstream pair of upper and lower feed rollers.

In a further aspect, the present subject matter is directed to a sugarcane harvester configured to simultaneously harvest first and second rows of sugarcane. The harvester includes a first base cutter assembly configured to sever sugarcane stalks of the first row of sugarcane and a second base cutter assembly configured to sever sugarcane stalks of the second row of sugarcane, with the first base cutter assembly defining a first central base cutter axis. The harvester also includes a feed train assembly positioned downstream of the first and second base cutter assemblies. The feed train assembly includes a first feed section configured to receive a first mat of severed sugarcane stalks from the first base cutter assembly, with the first feed section comprising a plurality of first pairs of upper and lower feed rollers configured to convey the first mat of severed sugarcane stalks from a first inlet of the first feed section to a first outlet of the first feed section. The plurality of first pairs of upper and lower feed rollers comprises a first upstream pair of upper and lower feed rollers positioned immediately downstream of the first base cutter assembly. The feed train assembly also includes a second feed section configured to receive a second mat of severed sugarcane stalks from the second base cutter assembly, with the second feed section comprising a plurality of second pairs of upper and lower feed rollers configured to convey the second mat of sugarcane from a second inlet of the second feed section to a second outlet of the second feed section. In addition, the feed train assembly includes a combined feed section positioned downstream of the first and second feed sections and configured to receive the first and second mats of severed sugarcane stalks from the first and second feed sections, respectively. Moreover, a rotational axis of the lower feed roller of the first upstream pair of upper and lower feed rollers is oriented non-parallel relative to a rotational axis of the upper feed roller of the first upstream pair of upper and lower feed rollers.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
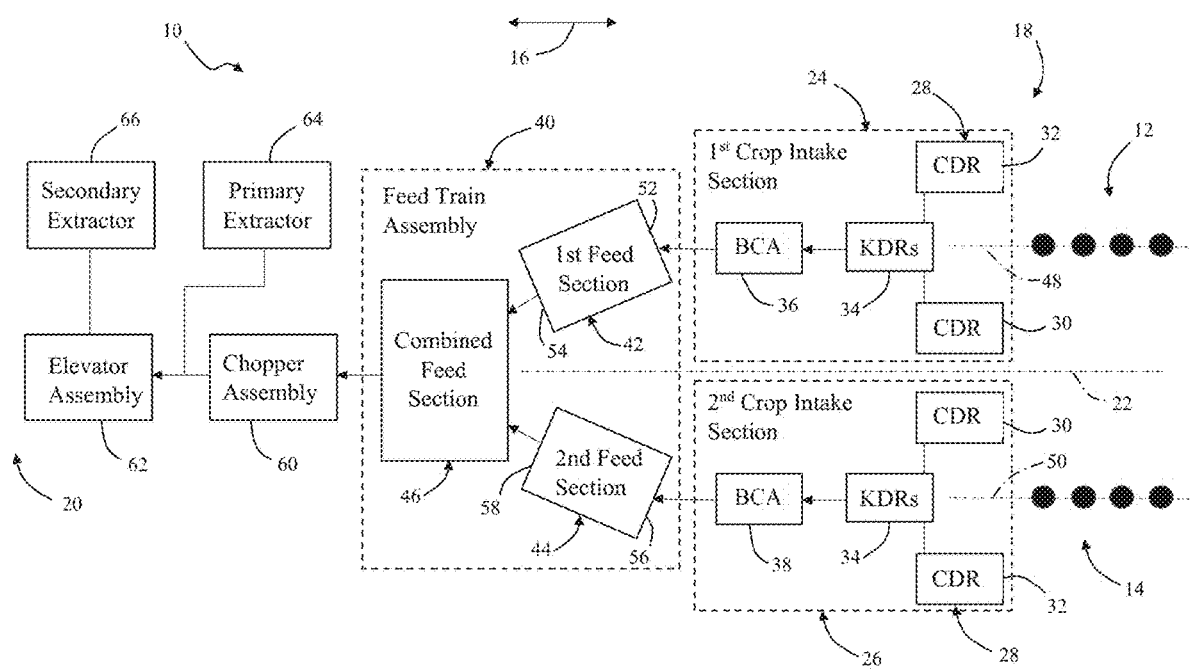
FIG. 1 illustrates a schematic view of one embodiment of a multi-row sugarcane harvester in accordance with aspects of the present subject matter.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to an improved feed train assembly with skewed roller pairs for use within a multi-row sugarcane harvester. In several embodiments, the feed train assembly includes first and second feed sections for conveying respective mats of severed sugarcane stalks (e.g., deriving from separate sugarcane rows) from an upstream base cutter assembly to a downstream combined feed section for subsequent delivery of the merged mat of stalks to a chopper assembly of the harvester. Each of the first and second feed sections includes a plurality of pairs of upper and lower feed rollers. However, in contrast to known prior art arrangements, the rotational axes of at least one of the pairs of upper and lower rollers are skewed or offset from each other.

In several embodiments, the furthest upstream pair of upper and lower rollers of each of the first and second feed trains is configured as a skewed pair of rollers. Specifically, the rotational axis of the lower roller of each upstream pair of rollers is skewed or offset relative to the rotational axis of the upper roller of each upstream pair of rollers. For example, in one embodiment, the rotational axis of the lower roller of each upstream pair of rollers may be oriented substantially perpendicular to a central base cutter axis of the adjacent base cutter assembly positioned immediately upstream of such roller, while the rotational axis of the upper roller of each upstream pair of rollers may be oriented substantially perpendicular to a skewed or angled feed axis (e.g., relative to the central base cutter axis) of the respective feed section. In such an embodiment, the lower roller of each upstream pair of feed rollers may function as a "butt-lifter" or "butt-lift" roller to lift the sugarcane severed by the adjacent base cutter assembly, while the upper roller of each upstream pair of feed rollers may function as a "steering" or "turning" rollers to initiate the "steering" or "turning" process in which the general flow direction of the mat of stalks is redirected from being substantially parallel to the respective central base cutter axis to being substantially parallel to the respective feed axis. Such dual-functionality of the upstream pair of rollers allows for the overall length of the feed train assembly (and, thus, the overall length of the machine) to be reduced, as the "steering" or "turning" process is initiated at the furthest upstream pair of rollers as opposed to the next adjacent downstream pair of feed rollers. For example, in some implementations, the skewed pair of upstream feed rollers may allow for the elimination of one pair of feed rollers from each of the first and second feed trains as compared to prior art arrangements.

Referring now to the drawings, FIG. 1 illustrates a schematic view of one embodiment of a multi-row sugarcane harvester 10 for harvesting first and second rows 12, 14 of sugarcane. It should be appreciated that, for purposes of illustration, the harvester 10 is shown in FIG. 1 as primarily including various components for cutting/harvesting, processing, cleaning, and discharging sugarcane as the cane is being harvested from an agricultural field. However, it should be appreciated that the harvester 10 may also include various other components, including drive components, traction components, hydraulic system components, and operator-related components. For instance, as is generally understood, the harvester 10 may include a frame or chassis, a pair of front traction devices (e.g., wheels or tracks), a pair of rear traction devices (e.g., wheels or tracks), and an operator's cab supported by the chassis. The harvester 10 may also include a primary source of power (e.g., an engine mounted on the chassis) which powers one or both pairs of the traction devices via a transmission, as well as one or more hydraulic fluid pumps configured to generate pressurized hydraulic fluid for powering the various hydraulic components of the harvester 10 (e.g., a plurality of hydraulic motors). Additionally, it should be appreciated that the harvester 10 may also include any other suitable components to facilitate cutting/harvesting, processing, cleaning, and/or discharging sugarcane.

As particularly shown in FIG. 1, the harvester 10 generally extends in lengthwise direction 16 between a forward end 18 and an aft end 20 along a central fore-to-aft or longitudinal axis 22, which is generally oriented substantially parallel to the rows 12, 14 being harvested. As shown, the harvester 10 includes first and second crop intake sections 24, 26 positioned at its forward end 18 for intaking and cutting the sugarcane of the first and second rows 12, 14, respectively. Each crop intake section 24, 26 includes a crop divider assembly 28 for gathering the sugarcane stalks of the respective rows 12, 14 being harvested. As shown in FIG. 1, each crop divider assembly 28 includes a pair of spiral crop divider rollers (CDRs), including an inner CDR 30 positioned closest to the central longitudinal axis 22 of the harvester 10 and an outer CDR 32 positioned further away from the central longitudinal axis 22. The lateral spacing between the inner and outer CDRs 30, 32 of each crop divider assembly 28 is generally selected such that the respective row 12, 14 of sugarcane to be harvested is gathered between such CDRs 30, 32 without intake of any adjacent sugarcane rows into the corresponding crop intake section 24, 26.

Additionally, as shown in FIG. 1, each crop intake section 24, 26 includes one or more knock-down rollers (KDRs) 34 positioned within a throat of the intake section 24, 26 defined between the CDRs 30, 32 and a base cutter assembly (BCA) (e.g., a first base cutter assembly 36 of the first intake section 24 and a second base cutter assembly 38 of the second intake section 26) positioned downstream of the knock-down rollers 34. As the knock-down roller(s) 34 is rotated, the sugarcane stalks being harvested are knocked down while the CDRs 30, 32 gather the stalks from the field into the throat of each respective intake section 12, 14. Each base cutter assembly 36, 38 then severs the base of the downwardly angled stalks As will be described below, each base cutter assembly 36, 38 generally includes a pair of cutting discs with blades positioned along the outer periphery of each disc for severing the sugarcane stalks. The cutting discs are generally configured to be rotated via a hydraulic motor (not shown) powered by the vehicle's hydraulic system.

It should be appreciated that, although not shown, the harvester 10 may also include one or more topper assemblies positioned at the forward end 18 of the harvester 10, such as a single or common topper assembly for both rows 12, 14 being harvested or a separate topper assembly for each respective row 12, 14 being harvested. Each topper assembly may include, for example, a gathering disk and a cutting disc, with the gathering disk being configured to gather the sugarcane stalks so that the cutting disc may be used to cut off the top of each stalk. In addition, although not shown, the harvester 10 may also include a fin roller positioned behind the knock-down roller(s) 34. For instance, the fin roller may include plurality of intermittently mounted fins that assist in further forcing the sugarcane stalks downwardly after being knocked down by the knock-down roller(s) 34.

As shown in FIG. 1, the harvester 10 also includes a feed train assembly 40 located downstream of the crop intake sections 24, 26 for conveying the severed stalks of sugarcane from each crop intake section 24, 26 to a further downstream chopper assembly 60. The feed train assembly 40 includes first and second feed sections 42, 44 and a combined feed section 46 downstream of the first and second feed sections 42, 44, with each feed section 42, 44, 46 including pairs of feed rollers (not shown) for conveying the severed sugarcane stalks received from the crop intake sections 24, 26 rearwardly to the chopper assembly 60. For example, in several embodiments, the first and second feed sections 42, 44 are configured to receive a flow or mat of severed sugarcane stalks from the first and second crop intake sections 24, 25, respectively and convey such separate flows or mats rearwardly into the combined feed section 46 for merging into a single merged flow or mat of sugarcane stalks. Specifically, upon being gathered, knocked down, and cut, the severed stalks from the first row 12 of sugarcane flow into the first feed section 42 and are directed rearwardly through such feed section 42 for delivery to the combined feed section 46. Similarly, upon being gathered, knocked down, and cut, the severed stalks from the second row 14 of sugarcane flow into the second feed section 44 and are directed rearwardly through such feed section 44 for delivery to the combined feed section 46. The merged flow or mat of sugarcane stalks directed through the combined feed section 46 is then fed downstream to the chopper assembly 60.

As will be described below, in several embodiments, the feed sections 42, 44, 46 may be configured to form a "y-shaped" feed train assembly 40. For instance, in one embodiment, the combined feed section 46 may generally be centered along the longitudinal axis 22 of the harvester 10 while the various components of each crop intake section 24, 26 may generally be centered along respective first and second crop intake axes 48, 50 extending substantially parallel to, but spaced apart laterally from the longitudinal axis 22 (e.g., by a lateral distance equal to one-half the spacing defined between adjacent rows 12, 14). In such an embodiment, the first and second feed sections 42, 44 may be angled inwardly relative to the longitudinal axis 22 such that the severed stalks delivered into each feed section 42, 44 from its respective intake section 24, 25 can be fed both rearwardly and inwardly (relative to the longitudinal axis 22) towards the combined feed section 36. For instance, as shown in FIG. 1, each of the first and second feed sections 42, 44 defines an inlet (e.g., a first inlet 52 of the first feed section 42 and a second inlet 56 of the second feed section 44) immediately downstream of the adjacent base cutter assembly 36, 38 and an outlet (e.g., a first outlet 54 of the first feed section 42 and a second outlet 58 of the second feed section 44) flowing into the combined feed section 46. As shown in the illustrated embodiment, the inlet 52, 54 of each feed section 24, 26 is generally centered along the crop intake axis 48, 50 of its respective crop intake section 24, 26, with the feed section 42, 44 being angled inwardly as it extends towards the combined feed section 46 such that the outlet 54, 58 of each feed section 42, 44 is positioned closer to the longitudinal axis 22 of the harvester 10 than the outlet 54, 58 of each feed section 42, 44.

It should be appreciated that, as used herein, a first component or axis is considered to be oriented substantially parallel to a second component or axis if the first component or axis is oriented relative to the second component or axis at an angle falling within an angular range of zero degrees plus-or-minus (+/−) 5 degrees, wherein an angle of zero degrees corresponds to a fully parallel orientation. Similarly, as used herein, a first component or axis is considered to be oriented substantially perpendicular to a second component or axis if the first component or axis is oriented relative to the second component or axis at an angle falling within an angular range of 90 degrees plus-or-minus (+/−) 5 degrees, wherein an angle of 90 degrees corresponds to a fully perpendicular orientation.

Referring still to FIG. 1, the chopper assembly 60 is located at the downstream end of the feed train assembly 40 (e.g., adjacent to the downstream end of the combined feed section 46). In general, the chopper assembly 60 is used to cut or chop the severed sugarcane stalks into pieces or "billets", which may be, for example, six (6) inches long. The billets may then be propelled towards an elevator assembly 62 of the harvester 10 for delivery to an external receiver or storage device. Additionally, pieces of debris (e.g., dust, dirt, leaves, etc.) separated from the sugarcane billets may be expelled from the harvester 10 through a primary extractor 64, which is located immediately behind the chopper assembly 60 and is oriented to direct the debris outwardly from the harvester 10. As is generally understood, the primary extractor 64 may include, for example, an extractor hood and an extractor fan mounted within the hood for generating a suction force or vacuum sufficient to pick up the debris and force the debris through the hood. The separated or cleaned billets, heavier than the debris being expelled through the extractor 64, may then fall downward to the elevator assembly 62. Moreover, as shown in FIG. 1, the harvester 10 may also include an optional a secondary extractor 66 positioned at or adjacent to the distal end of the elevator assembly 62. For example, the secondary extractor 66 may be located above a discharged opening of the elevator assembly 62. In such an embodiment, upon being further "cleaned" by the secondary extractor 66, the billets may then fall downwardly through the elevator discharge opening into an external storage device (not shown), such as a sugarcane billet cart.

Figure 2:
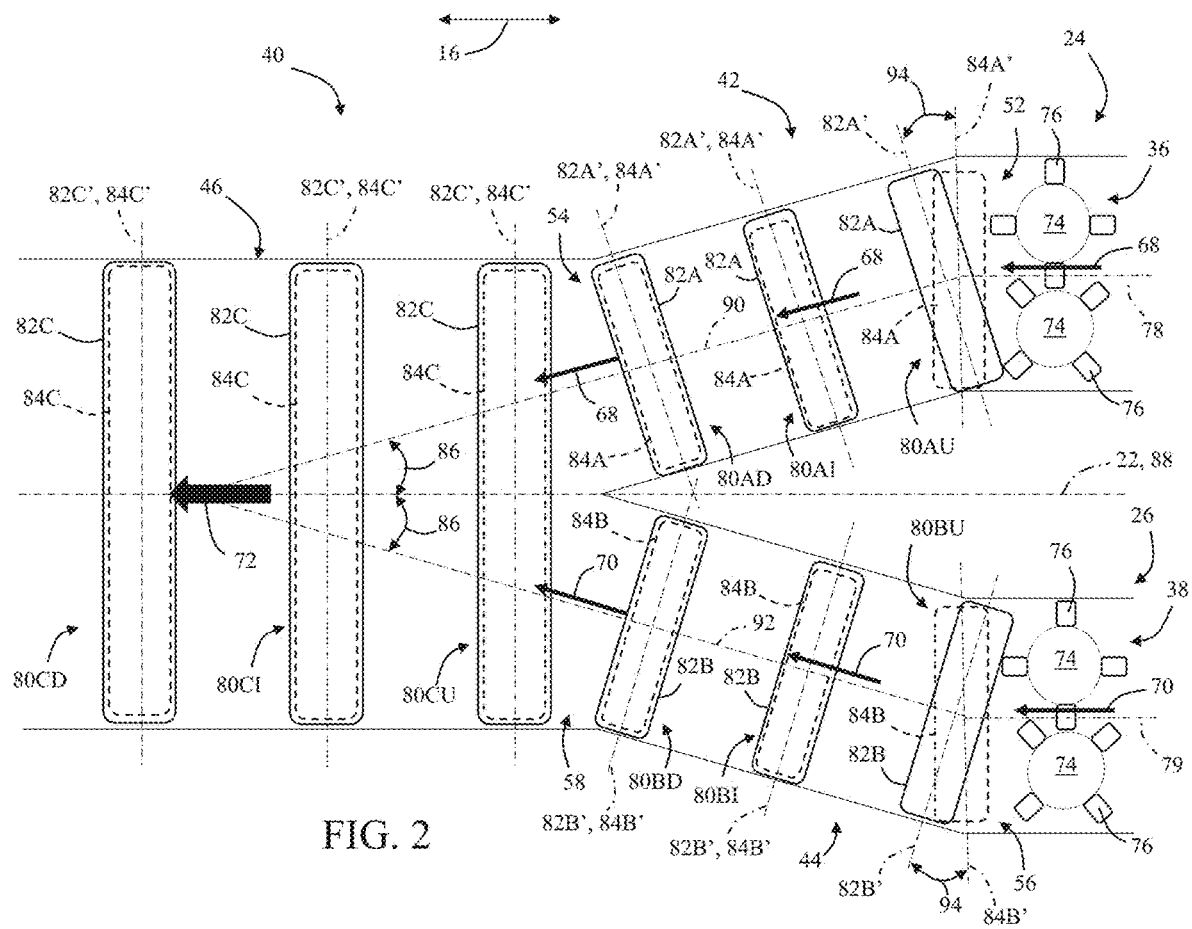
FIG. 2 illustrates a top-down, schematic view of one embodiment of a feed train assembly suitable for use with the harvester shown in FIG. 1 in accordance with aspects of the present subject matter.

Referring now to FIG. 2, a top-down, schematic view of one embodiment of the feed train assembly 40 described above with reference to FIG. 1 is illustrated in accordance with aspects of the present subject matter, particularly illustrating the various feed sections 42, 44, 46 of the feed train assembly 40 as well as the first and second base cutter assemblies 36, 38 positioned at the downstream ends of the respective crop intake sections 24, 26. As indicated above, the first feed section 42 of the feed train assembly 40 is generally configured to receive a first flow or mat of severed sugarcane stalks (indicated by arrows 68) from the first crop intake section 24 while the second feed section 44 of the feed train assembly 40 is generally configured to receive a second flow or mat of severed sugarcane stalks (indicated by arrows 70) from the second crop intake section 26. The separate flows or mats 68, 70 of severed sugarcane stalks are then combined or merged within the combined feed section 46 into a single flow or mat of stalks (indicated by arrow 72) for subsequent delivery to the downstream chopper assembly 60 (FIG. 1) of the harvester 10.

As shown in FIG. 2, each feed section 42, 44, 46 of the feed train assembly 40 generally includes a plurality of pairs 80 of feed rollers, with each pair 80 of feed rollers including an upper feed roller 82 and a lower feed roller 84. Specifically, the first feed section 42 includes a plurality of first pairs 80A of feed rollers (e.g., an upstream pair 80AU of feed rollers, an intermediate pair 80AI of feed rollers, and a downstream pair 80AD of feed rollers), with each of such pairs 80A including an upper feed roller 82A and a lower feed roller 84A. Similar, the second feed section 44 includes a plurality of second pairs 80B of feed rollers (e.g., an upstream pair 80BU of feed rollers, an intermediate pair 80BI of feed rollers, and a downstream pair 80BD of feed rollers), with each of such pairs 80B including an upper feed roller 82B and a lower feed roller 84B. Additionally, the combined feed section 44 includes a plurality of pairs 80C of feed rollers (e.g., an upstream pair 80CU of feed rollers, an intermediate pair 80CI of feed rollers, and a downstream pair 80CD of feed rollers), with each of such pairs 80C including an upper feed roller 82C and a lower feed roller 84C. To facilitate conveyance of the severed stalks through the various feed sections 42, 44, 46 of the feed train assembly 40, each of the feed rollers 82, 84 may generally be configured to rotate about a rotational axis (each axis being identified in FIG. 2 as the reference character for the associated fee roller 82, 84 with an apostrophe (') added thereafter). For instance, in one embodiment, the feed rollers 82, 84 may be configured to be rotationally driven (e.g., via respective hydraulic motors (not shown)) about their respective rotational axes.

It should be appreciated that, for purposes of illustration, the upper feed rollers 82 are drawn with solid lines while the lower feed rollers 84 are drawn with dashed lines. Additionally, the lower feed rollers 84 are shown as being slightly smaller than the upper feed rollers 82 to allow the lower feed rollers 84 to be visible within the top-down view of FIG. 2. However, it should be appreciated that the lower feed rollers 84 may have any size relative to the size of the upper feed rollers 82, including being the same size of the upper feed rollers 82 or being larger than the upper feed rollers 84. It should also be appreciated that, although the various feed sections 42, 44, 46 of the illustrated feed train assembly 40 are each shown as including three pairs 80 of feed rollers, each feed section 42, 44, 46 may generally include any suitable number of pairs 80 of feed rollers, including less than three pairs 80 of feed rollers (e.g., two pairs of feed rollers) and greater than three pairs 80 of feed rollers (e.g., four or more pairs of feed rollers).

Additionally, as shown in FIG. 2, each base cutter assembly 36, 38 generally includes a pair of cutting discs 74 configured to be rotated via a hydraulic motor and associated gearbox (not shown). Each cutting disc 74 is equipped with blades 76 positioned along its outer periphery for severing the sugarcane stalks. As shown in FIG. 2, each base cutter assembly 36, 38 generally defines a central base cutter axis 78, 79 (e.g., positioned equidistant from the rotational axes of the cutting discs 74). For instance, the first base cutter assembly 36 of the first intake section 24 defines a first central base cutter axis 78, while the second base cutter assembly 38 of the second intake section 26 defines a second central base cutter axis 79. In one embodiment, each central base cutter axis 78, 79 may be oriented substantially parallel to (including being coaxial or substantially coaxial with) the associated intake axis 48, 50 (FIG. 1) of the respective crop intake section 24, 26.

As indicated above, in several embodiments, the feed train assembly 40 may be configured to have a "Y-shaped" arrangement or configuration. Specifically, as shown in FIG. 2, each of the first and second feed sections 42, 44 is generally oriented at an inwardly extending angle 86 relative to a central feed axis 88 of the combined feed section 46, with such axis 88 being generally configured to extend substantially parallel to (including being coaxial or substantially coaxial with) the longitudinal axis 22 of the harvester 10. For instance, the first feed section 42 generally extends lengthwise along a first feed axis 90 from a first inlet 52 (e.g., defined vertically between the upper and lower feed rollers 82A, 84A of the upstream pair 80AU of feed rollers of the first feed section 42) to a first outlet 54 (e.g., defined vertically between the upper and lower feed rollers 82A, 84A of the downstream pair 80AD of feed rollers of the first feed section 42), with the first inlet 52 being positioned immediately downstream of the adjacent base cutter assembly 36 of the first intake section 42 and the first outlet 54 being positioned immediately upstream and/or terminating at the combined feed section 46. Similarly, the second feed section 44 generally extends lengthwise along a second feed axis 92 from a second inlet 56 (e.g., defined vertically between the upper and lower feed rollers 82B, 84B of the upstream pair 80BU of feed rollers of the second feed section 44) to a second outlet 58 (e.g., defined vertically between the upper and lower feed rollers 82B, 84B of the downstream pair 80BD of feed rollers of the second feed section 44), with the second inlet 56 being positioned immediately downstream of the adjacent base cutter assembly 38 of the second intake section 26 and the second outlet 58 being positioned immediately upstream and/or terminating at the combined feed section 46. As shown in FIG. 2, the feed axis 90, 92 of each of the first and second feed sections 42, 44 is oriented at an acute feed angle 86 relative to the central feed axis 88 such that severed stalks received at the inlet 52, 56 of each feed section 42, 44 are directly rearwardly and inwardly (relative to the central feed axis 88) towards the center of the combined feed section 46. Thus, during operation, the first flow or mat 68 of severed stalks is generally directed past the base cutter assembly 36 of the first intake section 24 along the first central base cutter axis 78 (e.g., substantially parallel to the central feed axis 88) until the flow/mat 68 of stalks enters the inlet 52 of the first feed section 42, at which point the flow/mat 68 of stalks is turned inwardly for conveyance along the first feed axis 90 (e.g., at the feed angle 86 relative to the central feed axis 88) towards the combined feed section 46. Similarly, the second flow or mat 70 of severed stalks is generally directed past the base cutter assembly 38 of the second intake section 26 along the second central base cutter axis 78 (e.g., substantially parallel to the central feed axis 88) until the flow/mat 70 of stalks enters the inlet 56 of the second feed section 44, at which point the flow/mat 70 of stalks is turned inwardly for conveyance along the second feed axis 92 (e.g., at the feed angle 86 relative to the central feed axis 88) towards the combined feed section 46.

Referring still to FIG. 2, in accordance with aspects of the present subject matter, one or more of the pairs 80 of feed rollers may correspond to or be configured as a skewed or offset pair of rollers, while the remainder of the pairs 80 of feed rollers each correspond to or are configured as a parallel pair of rollers. In several embodiments, the lower feed rollers 82 positioned furthest upstream within the feed train assembly 40 are configured to be oriented non-parallel relative to the remainder of the feed rollers 82, 84 included within its associated feed section 42, 44 and/or non-parallel relative to the feed axis 90, 92 of its associated feed section 42, 44. For example, as shown in FIG. 2, the rotational axis 84A' of the lower roller 84A of the upstream pair 80AU of feed rollers of the first feed section 42 is oriented non-parallel relative to the rotational axes 82A', 84' of the remainder of the feed rollers 82A, 84A included within the first feed section 42. Specifically, in the illustrated embodiment, the rotational axis 84A' of the lower roller 84A' of the upstream pair 80AU of feed rollers of the first feed section 42 is oriented substantially perpendicular to the first central base cutter axis 78 (and also substantially perpendicular to the central feed axis 88 and/or the first intake axis 48 (FIG. 1) of the first intake section 24) while the rotational axes 82A', 84A' of the remainder of the feed rollers 82A, 84A of the first feed section 42 are oriented substantially perpendicular to the feed axis 90 of the first feed section 42. As such, in contrast to the intermediate and downstream pairs 80AI, 80AD of feed rollers of the first feed section 42 in which the rotational axes 82A', 84A' of each roller pair are oriented substantially parallel to each other (and substantially perpendicular to the first feed axis 90), the rotational axes 82A', 84A' of the upper and lower feed rollers 82A, 84A of the upstream pair 80AU are oriented non-parallel to each other (i.e., by being offset from each other by an acute offset angle 94).

Similarly, as shown in FIG. 2, the rotational axis 84B' of the lower roller 84B of the upstream pair 80BU of feed rollers of the second feed section 44 is oriented non-parallel relative to the rotational axes 82B', 84B' of the remainder of the feed rollers 82B, 84B included within the second feed section 44. Specifically, in the illustrated embodiment, the rotational axis 84B' of the lower roller 84B of the upstream pair 84BU of feed rollers of the second feed section 44 is oriented substantially perpendicular to the second central base cutter axis 79 (and also substantially perpendicular to the central feed axis 88 and/or the second intake axis 50 (FIG. 1) of the second crop intake section 26) while the rotational axes 82B', 84B' of the remainder of the feed rollers 82B, 84B of the second feed section 44 are oriented substantially perpendicular to the feed axis 92 of the second feed section 44. As such, in contrast to the intermediate and downstream pairs 80BI, 80BD of feed rollers of the second feed section 44 in which the rotational axes 82B', 84B' of each roller pair are oriented substantially parallel to each other (and substantially perpendicular to the second feed axis 92), the rotational axes 82B', 84B' of the upper and lower feed rollers 82B, 84B of the upstream pair are oriented non-parallel to each other (i.e., by being offset from each other by an acute offset angle 94).

The offset or skewed arrangement of the upstream pair 80AU, 80BU of feed rollers for each of the first and second feed sections 42, 44 generally allows for enhanced transfer of the severed stalks from the adjacent base cutter assembly 36, 38 to the respective feed section 42, 44, while also allowing the general flow direction of the flow/mat 68, 70 of stalks entering each feed section 42, 44 to be immediately reoriented or redirected along the respective feed axis 90, 92. Specifically, by orienting the lower roller 84A, 84B of each upstream pair 80AU, 80BU of feed rollers substantially perpendicular to the central base cutter axis 78, 79 of the respective base cutter assembly 36, 38, such lower feed rollers 84A, 84B may function as "butt-lifters" or "butt-lift" rollers to lift the sugarcane severed by the adjacent base cutter assembly 36, 38. At the same time, by orienting the upper roller 82A, 82B of each upstream pair 80AU, 80BU of feed rollers substantially perpendicular to the feed axis 90, 92 of the respective feed section 42, 44 (and, thus, at the offset angle 94 relative to the respective lower roller 84A, 84B), such upper feed rollers 82A, 82B may function to initiate the "steering" or "turning" process in which the general flow direction of the flow/mat 68, 70 of stalks is reoriented or redirected from being substantially parallel to the respective central base cutter axis 78, 79 to being substantially parallel to the respective feed axis 90, 92. Accordingly, the upstream pair 80AU, 80BU of feed rollers for each of the first and second feed sections 42, 44 serves a dual-role or otherwise provides dual functionality (i.e., both butt-lifting functionality and turning functionality), which generally allows the feed sections 42, 44 to be shortened in length relative to prior art configurations.

Referring still to FIG. 2, as shown in the illustrated embodiment, the rotational axes 82C', 84C' of the feed rollers 82C, 84C of the combined feed section 46 are all configured to be oriented substantially perpendicular to the central feed axis 88. Specifically, the rotational axes 82C' 84C' of the upper and lower rollers 82C, 84C of each roller pair 80C of the combined feed section 46 are oriented substantially perpendicular to the central feed axis 88. As such, the combined or merged flow/mat 72 of stalks resulting from the separate respective flows/mats 68, 70 of stalks received from the first and second feed sections 42, 44 may be conveyed through the combined feed section 46 along the central feed axis 72 for subsequent delivery to the chopper assembly 60 (FIG. 1).

Figure 3:
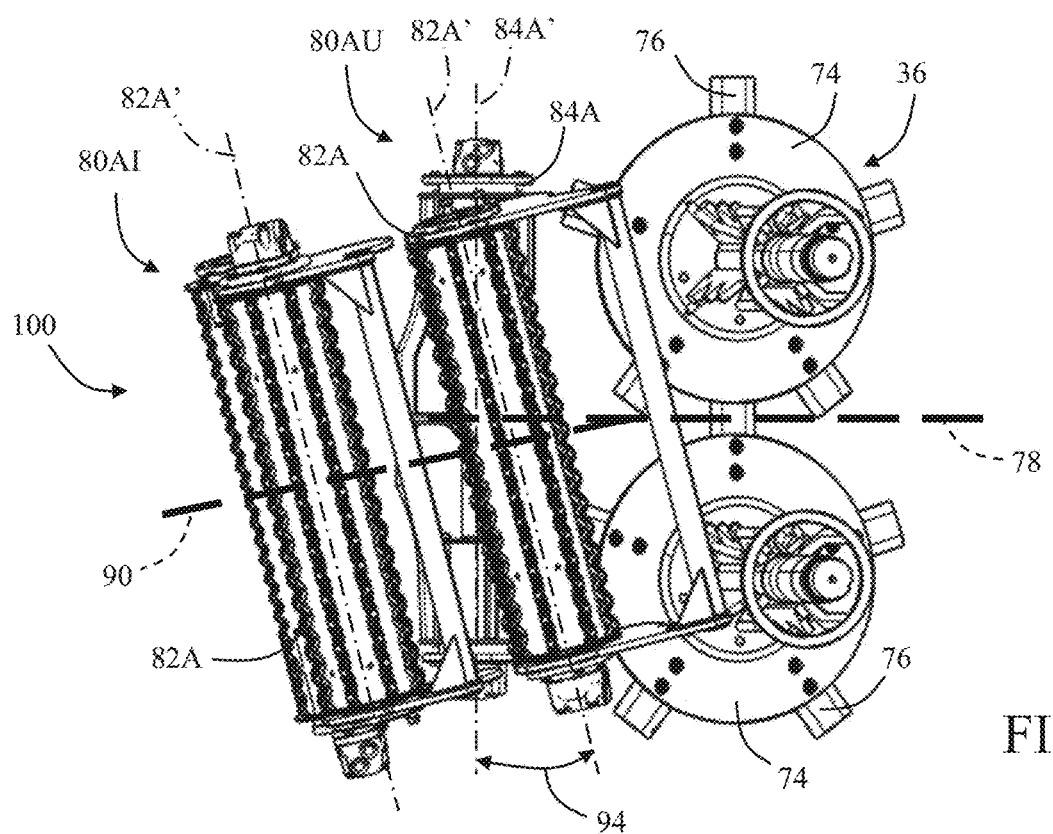
FIG. 3 illustrates a top view of one embodiment of a feed roller assembly suitable for use within the feed train assembly shown in FIG. 2 and/or the harvester shown in FIG. 1 in accordance with aspects of the present subject matter.
Figure 4:
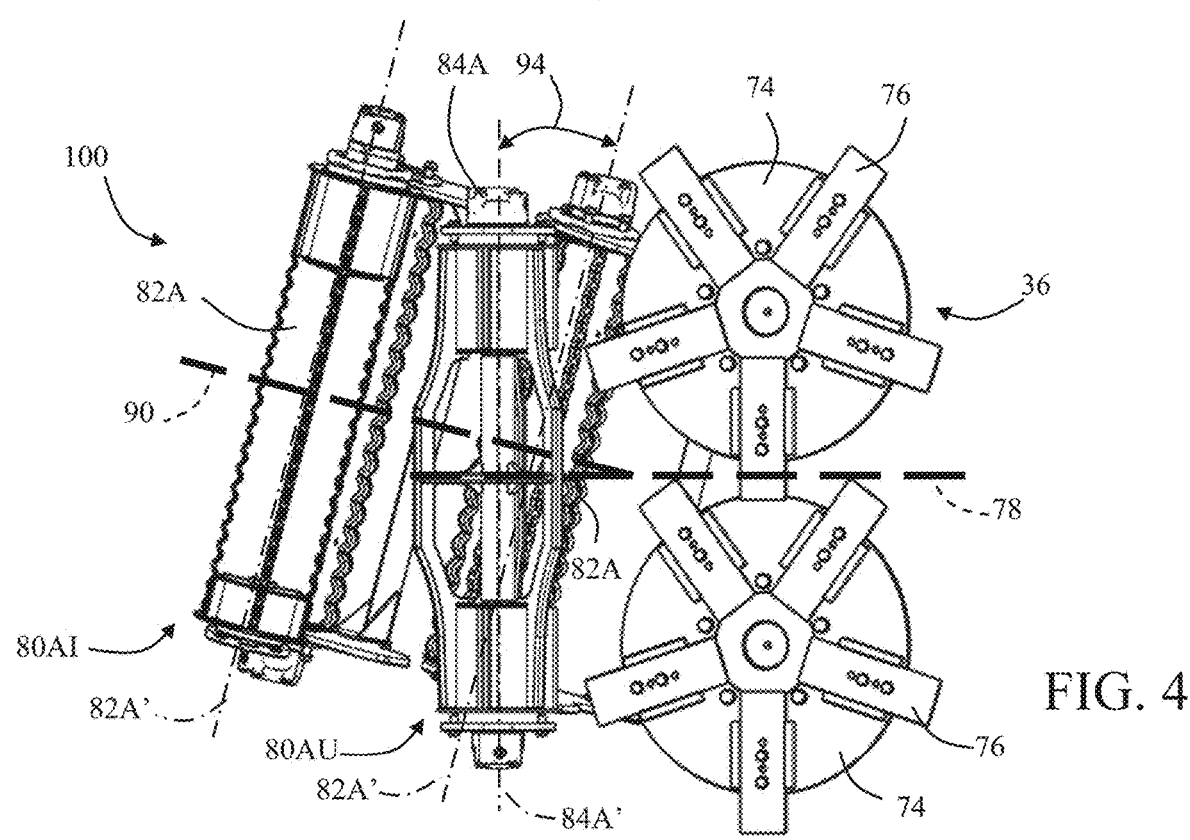
FIG. 4 illustrates a bottom view of the feed roller assembly shown in FIG. 3.

Referring now to FIGS. 3 and 4, respective top and bottom views of one embodiment of a feed roller assembly 100 suitable for use within the disclosed harvester 10 and/or the disclosed feed train assembly 40 are illustrated in accordance with aspects of the present subject matter, particularly illustrating the feed roller assembly 100 positioned relative to a pair of cutting discs 74 of an upstream base cutter assembly. Specifically, for purposes of description, the feed roller assembly 100 is shown as including the upper and lower rollers 82A, 84A of the upstream pair 80AU of feed rollers of the first feed section 42 (i.e., the pair of feed rollers 82A, 84A positioned closest to the adjacent base cutter assembly 36) as well as the upper roller 82A of the next adjacent pair of feed rollers of the first feed section 42 (i.e., the upper roller 82A of the intermediate pair 80AI of feed rollers). However, it should be appreciated that a similar configuration may also be utilized for the corresponding feed rollers 82B, 84B of the second feed section 44 (i.e., the upper and lower rollers 82B, 84B of the upstream pair 8OBU of feed rollers of the second feed section 44 and the upper roller 84B of the intermediate pair 80BI of feed rollers of the second feed section 44).

As particularly shown in the bottom view of FIG. 4, the rotational axis 84A' of the lower roller 84 of the upstream pair 80AU of feed rollers is oriented substantially perpendicular to the central base cutter axis 78 of the adjacent base cutter assembly 36. In contrast, the rotational axes 82A' of the upper rollers 82 shown in FIGS. 3 and 4 are oriented substantially perpendicular to the feed axis 90 of the associated feed section 42. As such, the rotational axis 84' of the lower roller 84' of the upstream pair 80AU of feed rollers is offset from the rotational axis 82' of the upper roller 82 of the upstream pair 80AU of feed rollers (and the upper roller 82 of the adjacent pair of feed rollers) by an offset angle 94. Thus, as described above, the lower roller 84A of the upstream pair 80AU of feed rollers functions as a butt-lifter or butt-lift roller for lifting the sugarcane stalks severed by the adjacent base cutter assembly 36 while the upper roller 82A of the upstream pair 80AU of feed rollers functions as "turning" or "steering" roller that serves to reorient or redirect the flow of sugarcane stalks towards a flow path extending substantially parallel to the feed axis 90 of the associated feed section 42.

Figure 5:
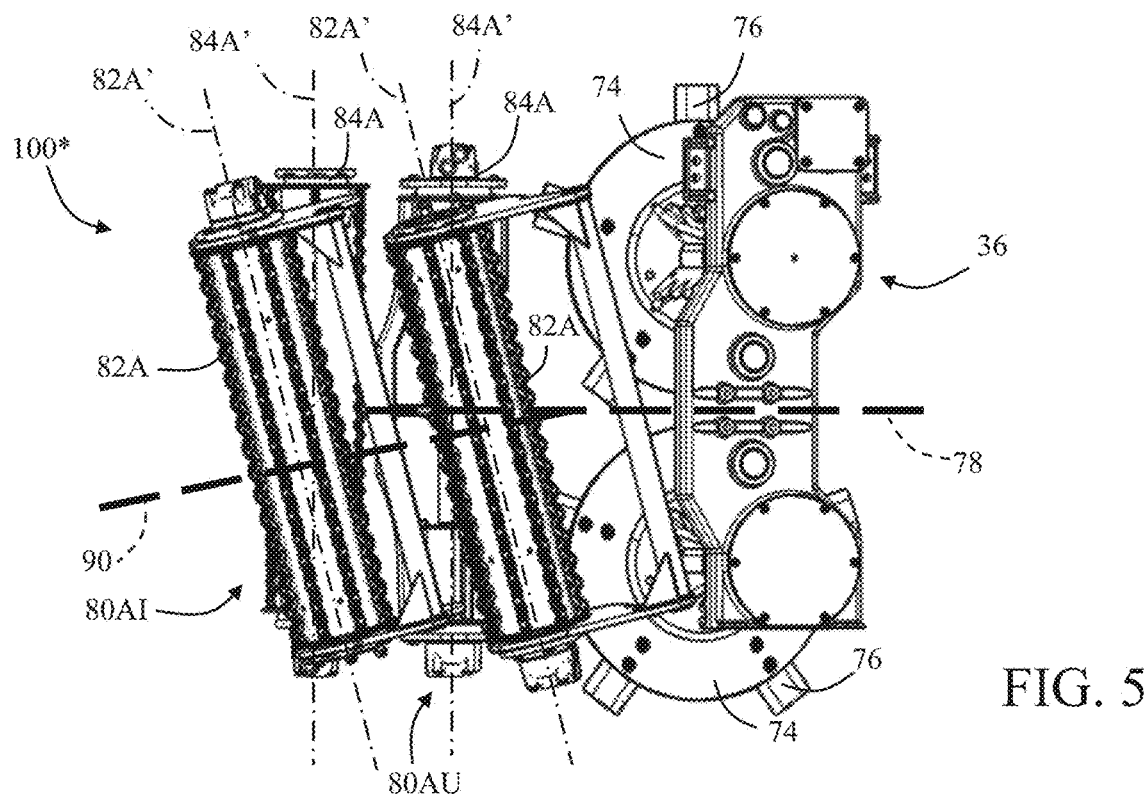
FIG. 5 illustrates a top view of an alternative embodiment of the feed roller assembly shown in FIGS. 3 and 4 in accordance with aspects of the present subject matter.
Figure 6:
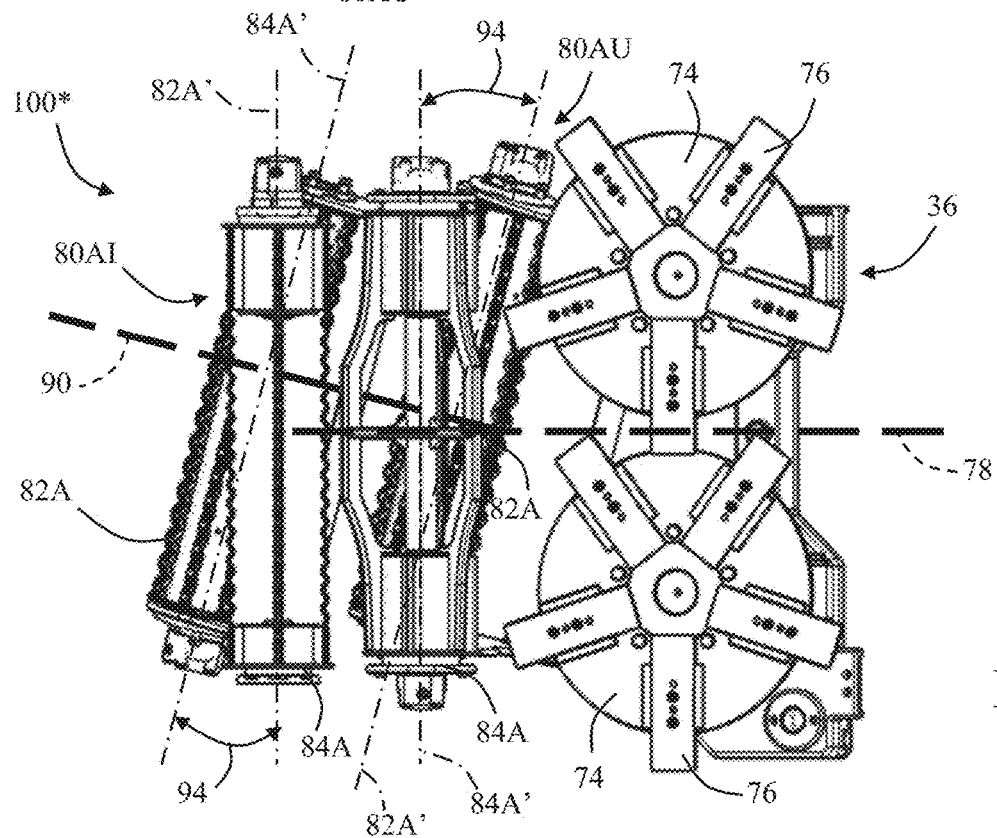
FIG. 6 illustrates a bottom view of the feed roller assembly shown in FIG. 5.

Referring now to FIGS. 5 and 6, respective top and bottom views of a feed roller assembly 100* providing an alternative embodiment of the feed roller assembly 100 described above with reference to FIGS. 3 and 4 are illustrated in accordance with aspects of the present subject matter, particularly illustrating the feed roller assembly 100* positioned relative to a pair of cutting discs 74 of an upstream base cutter assembly. For purposes of description, the feed roller assembly 100* is shown as including the upper and lower rollers 82A, 84A of the upstream pair 80AU of feed rollers of the first feed section 42 (i.e., the pair of feed rollers 82A, 84A positioned closest to the adjacent base cutter assembly 36) as well as the upper and lower rollers 82A, 84A of the next adjacent pair of feed rollers of the first feed section 42 (i.e., the upper and lower rollers 82A, 84A of the intermediate pair of feed rollers 80AI). However, it should be appreciated that a similar configuration may also be utilized for the corresponding feed rollers 82B, 84B of the second feed section 44 (i.e., the upper and lower rollers 82B, 84B of the upstream pair 80BU of feed rollers of the second feed section 44 and the upper and lower rollers 82B, 84B of the intermediate pair 80BI of feed rollers of the second feed section 44).

As shown, the upper rollers 82A of the feed roller assembly 100* are generally configured the same as that described above (e.g., by having rotational axes 82A' that are oriented substantially perpendicular to the feed axis 90 of the associated feed section 42). However, the rotational axes 84A' of the lower roller 84A of the upstream pair 80AU of feed rollers and the lower roller 84A of the adjacent intermediate pair 80AI of feed rollers are both oriented substantially perpendicular to the central base cutter axis 78 of the adjacent base cutter assembly 36. Thus, unlike the embodiment described above in which the rotational axis 84A' of the lower roller 84A' of the intermediate pair 80AI of feed rollers is configured to be oriented substantially perpendicular to the feed axis 90 of the associated feed section 42 (and substantially parallel to the rotational axis 82A' of the upper roller 82A of the intermediate pair 80AI of feed rollers), such lower roller 84A is oriented non-perpendicular to the feed axis 90 and non-parallel to the associated upper roller 82A. Specifically, as shown in FIG. 6, both lower rollers 84A are offset or skewed relative to their respective upper roller 82A by an offset angle 94.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims or if they include equivalent structural elements with insubstantial differences from the literal language of the claims.

What is claimed is:

1. A feed train assembly for a sugarcane harvester configured to simultaneously harvest first and second rows of sugarcane, the feed train assembly comprising:
   a first feed section configured to receive a first mat of sugarcane deriving from the first row of sugarcane, the first feed section comprising a plurality of first pairs of upper and lower feed rollers configured to convey the first mat of sugarcane from a first inlet of the first feed section to a first outlet of the first feed section, the plurality of first pairs of upper and lower feed rollers comprising a first upstream pair of upper and lower feed rollers positioned adjacent to the first inlet of the first feed section, wherein the first feed section is configured to convey the first mat of sugarcane from the first inlet to the first outlet along a first feed axis of the first feed section;

a second feed section configured to receive a second mat of sugarcane deriving from the second row of sugarcane, the second feed section comprising a plurality of second pairs of upper and lower feed rollers configured to convey the second mat of sugarcane from a second inlet of the second feed section to a second outlet of the second feed section; and a combined feed section positioned downstream of the first and second feed sections and configured to receive the first and second mats of sugarcane from the first and second feed sections, respectively, wherein a rotational axis of the lower feed roller of the first upstream pair of upper and lower feed rollers is oriented non-parallel relative to a rotational axis of the upper feed roller of the first upstream pair of upper and lower feed rollers, and wherein the rotational axis of the upper feed roller of the first upstream pair of upper and lower feed rollers is oriented substantially perpendicular to the first feed axis of the first feed section.

2. The feed train assembly of claim 1, wherein:

the first mat of sugarcane is directed into the first inlet of the first feed section along a crop intake axis, and the rotational axis of the lower feed roller of the first upstream pair of upper and lower feed rollers is oriented substantially perpendicular to the crop intake axis.

3. The feed train assembly of claim 1, wherein:

the first feed section is configured to convey the first mat of sugarcane from the first inlet to the first outlet along a first feed axis of the first feed section, the first mat of sugarcane is directed into the first inlet of the first feed section along a crop intake axis, the rotational axis of the upper feed roller of the first upstream pair of upper and lower feed rollers is oriented substantially perpendicular to the first feed axis of the first feed section, and the rotational axis of the lower feed roller of the first upstream pair of upper and lower feed rollers is oriented substantially perpendicular to the crop intake axis.

4. The feed train assembly of claim 1, wherein:

the plurality of second pairs of upper and lower feed rollers comprises a second upstream pair of upper and lower feed rollers positioned adjacent to the second inlet of the first feed section, and a rotational axis of the lower feed roller of the second upstream pair of upper and lower feed rollers is oriented non-parallel relative to a rotational axis of the upper feed roller of the second upstream pair of upper and lower feed rollers.

5. The feed train assembly of claim 1, wherein the first and second feed sections are arranged relative to the combined feed section such that the feed train assembly has a "Y-shaped" configuration.

6. The feed train assembly of claim 1, wherein the lower feed roller of the first upstream pair of upper and lower feed rollers is oriented relative to the first mat of sugarcane being received at the first inlet of the first feed section such that the lower feed roller functions as a butt-lift roller and the upper feed roller of the first upstream pair of upper and lower feed rollers is oriented relative to the first mat of sugarcane being received at the first inlet of the first feed section such that the upper feed roller functions as a turning roller that redirects the first mat of sugarcane along a first feed axis extending between the first inlet and the first outlet of the first feed section.

7. The feed train assembly of claim 1, wherein:

the plurality of first pairs of upper and lower feed rollers further comprises a first intermediate pair of upper and lower feed rollers positioned immediately downstream of the first upstream pair of upper and lower feed rollers, and a rotational axis of the lower feed roller of the first intermediate pair of upper and lower feed rollers is oriented non-parallel relative to a rotational axis of the upper feed roller of the first intermediate pair of upper and lower feed rollers.

8. A feed train assembly for a sugarcane harvester configured to simultaneously harvest first and second rows of sugarcane, the feed train assembly comprising:

a first feed section configured to receive a first mat of sugarcane deriving from the first row of sugarcane, the first feed section comprising a plurality of first pairs of upper and lower feed rollers configured to convey the first mat of sugarcane from a first inlet of the first feed section to a first outlet of the first feed section, the plurality of first pairs of upper and lower feed rollers comprising a first upstream pair of upper and lower feed rollers positioned adjacent to the first inlet of the first feed section;

a second feed section configured to receive a second mat of sugarcane deriving from the second row of sugarcane, the second feed section comprising a plurality of second pairs of upper and lower feed rollers configured to convey the second mat of sugarcane from a second inlet of the second feed section to a second outlet of the second feed section, the plurality of second pairs of upper and lower feed rollers comprising a second upstream pair of upper and lower feed rollers positioned adjacent to the second inlet of the first feed section; and a combined feed section positioned downstream of the first and second feed sections and configured to receive the first and second mats of sugarcane from the first and second feed sections, respectively, wherein:

a rotational axis of the lower feed roller of the first upstream pair of upper and lower feed rollers is oriented non-parallel relative to a rotational axis of the upper feed roller of the first upstream pair of upper and lower feed rollers, and a rotational axis of the lower feed roller of the second upstream pair of upper and lower feed rollers is oriented non-parallel relative to a rotational axis of the upper feed roller of the second upstream pair of upper and lower feed rollers.

9. The feed train assembly of claim 8, wherein:

the first feed section is configured to convey the first mat of sugarcane from the first inlet to the first outlet along a first feed axis of the first feed section and the second feed section is configured to convey the second mat of sugarcane from the second inlet to the second outlet along a second feed axis of the first feed section, and the rotational axis of the upper feed roller of the first upstream pair of upper and lower feed rollers is oriented substantially perpendicular to the first feed axis of the first feed section and the rotational axis of the upper feed roller of the second upstream pair of upper and lower feed rollers is oriented substantially perpendicular to the second feed axis of the second feed section.

10. The feed train assembly of claim 8, wherein:
the first mat of sugarcane is directed into the first inlet of the first feed section along a first crop intake axis and the second mat of sugarcane is directed into the second inlet of the second feed section along a second crop intake axis, and
the rotational axis of the lower feed roller of the first upstream pair of upper and lower feed rollers is oriented substantially perpendicular to the first crop intake axis and the rotational axis of the lower feed roller of the second upstream pair of upper and lower feed rollers is oriented substantially perpendicular to the second crop intake axis.

11. A sugarcane harvester configured to simultaneously harvest first and second rows of sugarcane, the harvester comprising:
a first base cutter assembly configured to sever sugarcane stalks of the first row of sugarcane, the first base cutter assembly defining a first central base cutter axis;
a second base cutter assembly configured to sever sugarcane stalks of the second row of sugarcane; and
a feed train assembly positioned downstream of the first and second base cutter assemblies, the feed train assembly comprising:
a first feed section configured to receive a first mat of severed sugarcane stalks from the first base cutter assembly, the first feed section comprising a plurality of first pairs of upper and lower feed rollers configured to convey the first mat of severed sugarcane stalks from a first inlet of the first feed section to a first outlet of the first feed section, the plurality of first pairs of upper and lower feed rollers comprising a first upstream pair of upper and lower feed rollers positioned immediately downstream of the first base cutter assembly;
a second feed section configured to receive a second mat of severed sugarcane stalks from the second base cutter assembly, the second feed section comprising a plurality of second pairs of upper and lower feed rollers configured to convey the second mat of sugarcane from a second inlet of the second feed section to a second outlet of the second feed section, the plurality of second pairs of upper and lower feed rollers comprising a second upstream pair of upper and lower feed rollers positioned immediately downstream of the second base cutter assembly; and
a combined feed section positioned downstream of the first and second feed sections and configured to receive the first and second mats of severed sugarcane stalks from the first and second feed sections, respectively,
wherein a rotational axis of the lower feed roller of the first upstream pair of upper and lower feed rollers is oriented non-parallel relative to a rotational axis of the upper feed roller of the first upstream pair of upper and lower feed rollers, and
wherein a rotational axis of the lower feed roller of the second upstream pair of upper and lower feed rollers is oriented non-parallel relative to a rotational axis of the upper feed roller of the second upstream pair of upper and lower feed rollers.

12. The harvester of claim 11, wherein:
the first feed section is configured to convey the first mat of sugarcane from the first inlet to the first outlet along a first feed axis of the first feed section, and
the rotational axis of the upper feed roller of the first upstream pair of upper and lower feed rollers is oriented substantially perpendicular to the first feed axis of the first feed section.

13. The harvester of claim 11, wherein the rotational axis of the lower feed roller of the first upstream pair of upper and lower feed rollers is oriented substantially perpendicular to the first central base cutter axis.

14. The harvester of claim 11, wherein:
the first feed section is configured to convey the first mat of sugarcane from the first inlet to the first outlet along a first feed axis of the first feed section,
the rotational axis of the upper feed roller of the first upstream pair of upper and lower feed rollers is oriented substantially perpendicular to the first feed axis of the first feed section, and
the rotational axis of the lower feed roller of the first upstream pair of upper and lower feed rollers is oriented substantially perpendicular to the first central base cutter axis.

15. The harvester of claim 11, wherein the first and second feed sections are arranged relative to the combined feed section such that the feed train assembly has a "Y-shaped" configuration.

16. The harvester of claim 11, wherein the lower feed roller of the first upstream pair of upper and lower feed rollers is oriented relative to the first base cutter assembly such that the lower feed roller functions as a butt-lift roller and the upper feed roller of the first upstream pair of upper and lower feed rollers is oriented relative to the first mat of sugarcane being received from the first base cutter assembly such that the upper feed roller functions as a turning roller that redirects the first mat of sugarcane along a first feed axis extending between the first inlet and the first outlet of the first feed section.

17. The harvester of claim 11, wherein:
the plurality of the first pairs of upper and lower feed rollers further comprises a first intermediate pair of upper and lower feed rollers positioned immediately downstream of the first upstream pair of upper and lower feed rollers, and
a rotational axis of the lower feed roller of the first intermediate pair of upper and lower feed rollers is oriented non-parallel relative to a rotational axis of the upper feed roller of the first intermediate pair of upper and lower feed rollers.

18. The harvester of claim 11, further comprising a chopper assembly positioned downstream of the combined feed section, the chopper assembly being configured to receive a merged mat of severed sugarcane stalks comprising a merged flow of the first and second mats of severed sugarcane stalks.

* * * * *